United States Patent [19]

Puryear

[11] 4,203,565
[45] May 20, 1980

[54] FISHING REEL SPOOL LOCKING KNOB

[75] Inventor: John W. Puryear, Tulsa, Okla.

[73] Assignee: Brunswick Corporation, Skokie, Ill.

[21] Appl. No.: 932,792

[22] Filed: Aug. 11, 1978

[51] Int. Cl.² .............................................. A01K 89/01
[52] U.S. Cl. .............................................. 242/84.1 R
[58] Field of Search .................... 242/84.21 R, 84.2 R, 242/84.21 A, 84.2 G, 84.51 R, 84.51 A, 84.5 A

[56] References Cited

U.S. PATENT DOCUMENTS

| | | | |
|---|---|---|---|
| 2,734,693 | 2/1956 | Rabezzana | 242/84.21 R |
| 2,773,654 | 12/1956 | Hubner | 242/84.21 R |
| 3,946,963 | 3/1976 | Oberg | 242/84.21 R |

Primary Examiner—Billy S. Taylor
Attorney, Agent, or Firm—John G. Heimovics

[57] ABSTRACT

This invention relates to conventional style and skirted style fishing reels wherein the spool flange edge that secures the spool to the center shaft is retained by the knob so that it does not fall away and separate from the spool.

7 Claims, 11 Drawing Figures

FISHING REEL SPOOL LOCKING KNOB

BACKGROUND OF THE INVENTION

1. Field of the Invention

This invention relates to conventional style and skirted style fishing reels, and more particularly, relates to a unique spool used to hold fishing line wherein the tightening knob is retained by the spool so that it cannot drop off the front of the fishing reel leaving the spool unattached to the central shaft.

2. Background of the Prior Art

It is well known in the prior art that in conventional style and skirted style spinning reels used in fishing that the spool mounted on the front of the reel has located therein a drag mechanism. In order to make the drag mechanism tighter or looser there is a front nut that is tightened down on the front of the reel. In the event that the nut comes loose and falls off, the fishing line is completely inoperative and there is no readily available way of tightening the spool on the central shaft. Many attempts have been made to overcome this deficiency but none has yet achieved the desired end of incorporating the tightening nut with the spool.

SUMMARY OF THE INVENTION

This invention relates to a unique fishing reel spool used on conventional and skirted style spinning reels whereby the nut used to tighten the spool on the center shaft is retained by the spool thus overcoming the difficulties found in the prior art.

It is therefore an object of this invention to provide a spool for conventional style and skirted style spinning reels whereby the nut is retained by the spool.

It is another object of this invention to provide such a spool so that in the event cleaning needs to be done, the normally retained threaded knob in the fishing reel can be removed.

Yet another object of this invention is for the provision for such a spool used on a fly reel.

The above and other and further objects and features will be more readily understood by reference to the following detailed description and the accompanying drawings.

DESCRIPTION OF THE PREFERRED EMBODIMENTS

Figure 1:
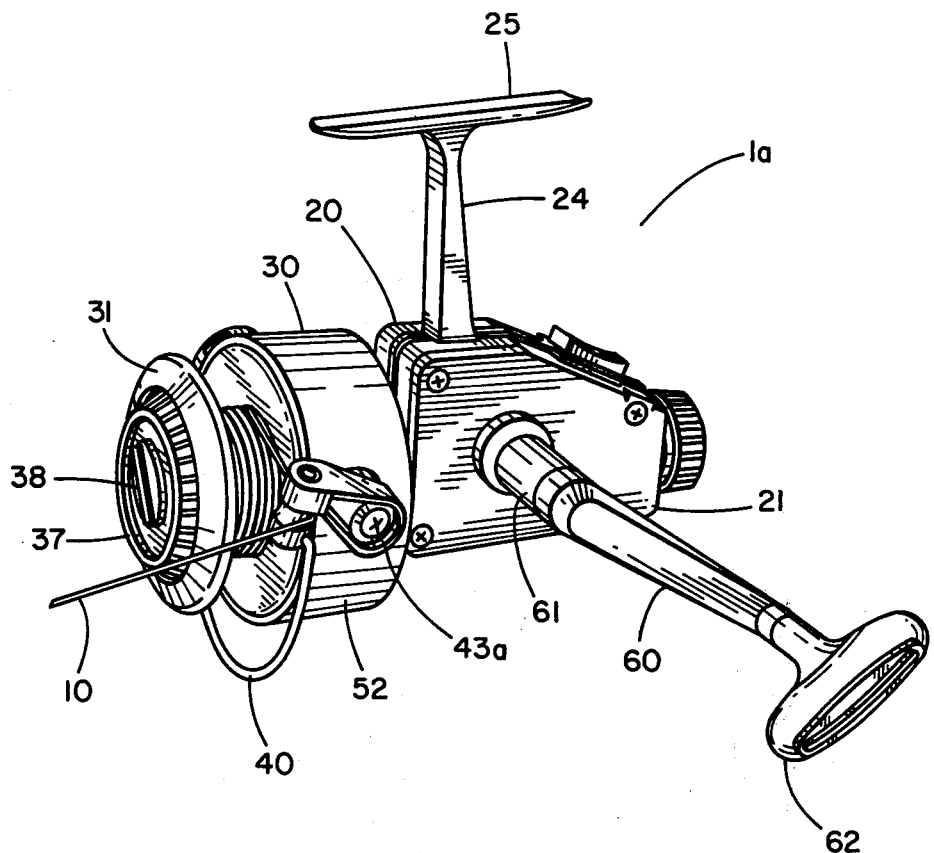
FIG. 1 is a perspective view of the conventional style spinning reel containing the invention described herein.
Figure 2:
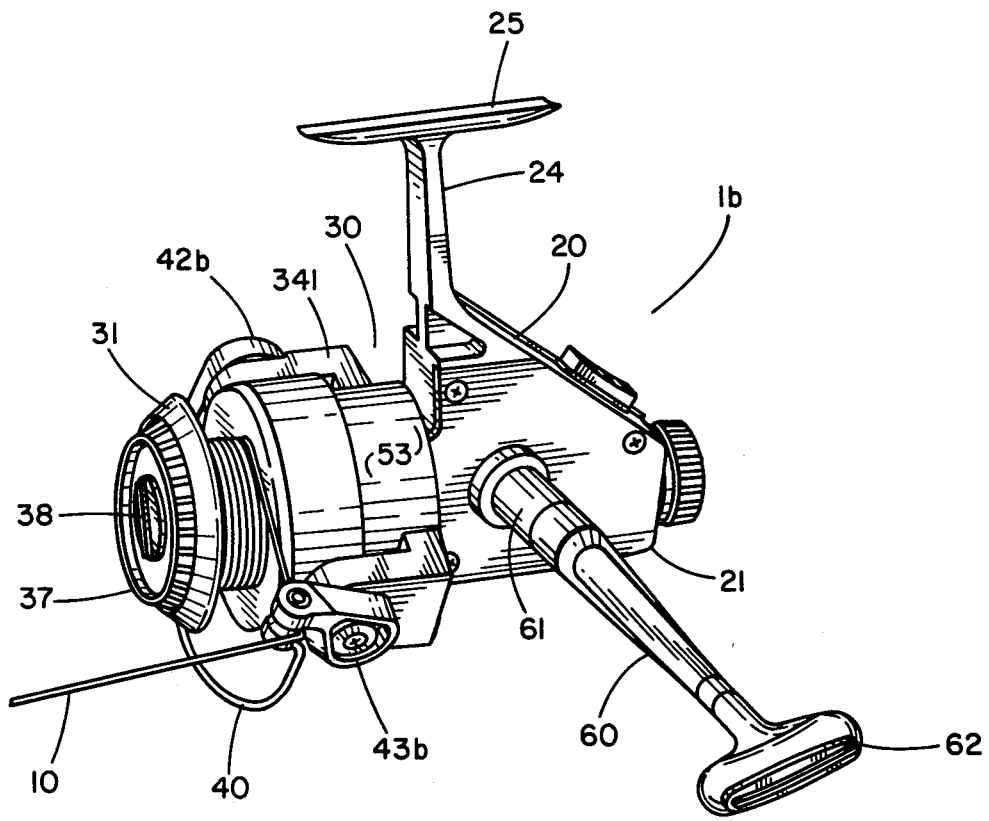
FIG. 2 is a perspective view of the skirted style spinning reel containing the invention described herein.

In FIG. 1, a conventional style open-face fishing reel 1a is shown and in FIG. 2 a skirted style open-face fishing reel 1b is shown. Both styles of reels function similarly, the only exception being the arrangement of the spool. As used hereinafter, the same numerals will designate the common parts for both reels; for special parts on the reels, different numerical designations will be used. The reel 1a or 1b having a housing 20 which includes an integral gear case 23, a stem 24 which connects the housing to a shoe 25. The shoe 25 is used to attach the reel to spinning style fishing rods. The reel includes a crank assembly 60, rotatable about a crank shaft hub 61 with a rotatable winding handle 62 for use by a fisherman with his left hand for line retrieval while the rod (not shown) is being held by the right hand as shown in FIGS. 1 and 2 only. As will be described hereinafter, the handle 60 may be disposed on the other side of the gear case 23 for accommodating the personal desires of the user.

An axially mounted rotor housing 30 is provided and adapted to rotate about the axis of the spool 31 as the crank 60 is turned for line retrieval, with the line 10 being captured by the bail 40 passing over the line guide assembly 41 as shown. Bail 40 and line guide 41 rotate with rotor 30 and the line 10 is thereby wound on the spool 31. The shank of the screws 32 and 33 function as rotary pivot bearing points and are accordingly the centers of rotation for the bail 40 via the bail arms 42a, 42b, 43a and 43b. An internal mechanism causes the line spool 31 to reciprocate axially back and forth as the rotor 30 winds the line 10 about the spool 31; but as in spinning reels generally, the spool 31 does not rotate about its central core axis, except as controllably permitted by the adjustable free-floating drag mechanism 50. Such permitted rotation of the spool may occur during the line retrieval when a fish is on the other end of the line 10 fighting for its life while still in the water; and thus the force of the drag friction is overcome by tension in the line. When the bail 40 is swung open from the line 10 to an open position for casting, the line 10 may freely pay out from the spool 31 over lip 99. In FIGS. 1, and 2, the bail 40 is shown in the "closed", "retrieve", or "rewind" position. The line guide roller 410 is preferably rotatable, that is, it is preferably a miniature pulley to reduce the sliding friction which might otherwise cause line wear.

In paying out the line 10 over the lip 99 of the forward flange of the line spool 31 during casting, the fisherman using an open face spinning reel is obligated to use his finger to snub the line and arrest its pay out, since the normal line drag provisions are not operative unless the reel is in the rewind or line retrieval mode of operation.

In the overall arrangement of the reel a cover plate 21 is secured to the gear case 23 by screws 26. Inside the gear case 23 is a gear assembly 70 that is rotatable by rotating the handle 62 about the hub 61. Oscillator gear 73 is rotatably mounted on stub shaft 27 which may be part of the interior of the housing gear case 23 or secured separately thereto. Gear 73 has an inwardly projecting plug 74 that fits into groove 76 of oscillator slider 75. Rotation of the gear 73 causes the slider 75 to slide forward and backward. Crank shaft gear assembly 64 has a tubular center shaft 65 that is journal mounted in bearings 66 in gear case 23 (partly shown) and in cover plate 21. The shaft 65 has an internal right hand thread that mates with the right hand thread 67c of shaft 67 on one side and a left hand thread that mates with left hand thread 67d when the shaft is placed on the other side of the reel. This dual threaded system enables the reel to be cranked both from the right hand and the left hand. The open end of the shaft 65 (the end which the shaft 67 is not inserted) is closed off by inserting screw cap 6 exterior of the gear case 23.

Small gear 68 meshes with gear 73 as the handle 62 rotates the shaft 67 thus providing the back and forth sliding motion to slider 75. A pinion gear assembly 80 is forwardly rotatably journal mounted in bearing 2 that is mounted in the forward section 22 of the housing 20 and secured there by bearing retainer 3 which fits into groove 4. The assembly 80 has a forward shaft 81 with oppositely spaced flats 82 thereon, a central bore 83, a forward threaded portion 84, a rearwardly projecting bearing stud 85 and a gear 86. The bearing stud 85 fits into bearing mount 28 which is part of housing 20. Thus, the pinion assembly 80 has two-point bearing support. The larger gear 69 engages pinion gear 86 causing it to rotate.

The center shaft 11 has back square portion 12, undercut grooves 13, front pin 14 which press fit into the shaft 11 and a front threaded portion 15, the shaft 11 slip fits into the pinion bore 83 and is supported thereby. The shaft 11 also fits through the hole 77 in slider 75. Special clip 16 fits around the hole 77 and slides into grooves 13 locking the shaft 11 to the slider 75. Thus, when the slider 75 oscillates back and forth the shaft 11 also moves back and forth with respect to the forward section 22 of the housing 20.

The rotor 30 is mounted on the forward portion 81 of assembly 80. The hole 34 with flats 34c is sufficiently large to pass over the pin 14 and then tighten on the forward threaded portion 84 by the use of tang 35 and nut 36; the respective flats 82 and 34c operable with each other. The spool 31 fits over the shaft 11 with the spool retainer knob 37 that is retained near the lip 99 having an internal threaded portion 39 that tightens down on thread 15. Thus, as the handle 62 turns the crank shaft 67, the gear assembly 64 causes the pinion assembly 80 to rotate which in turn causes the rotor 30 to rotate. At the same time rotation of gear 73 causes the slider 75 to reciprocate back and forth which causes the shaft 11 to move back and forth, so that line 10 can be wound during the retrieve mode in an orderly and uniform fashion on spool 31.

Contrary to standard spinning reels that have their drag associated with the front spool or locked into the back portion of the housing, the drag mechanism 50 is free-floating (it is self-contained as a unit and not captured in the housing).

Figure 3:
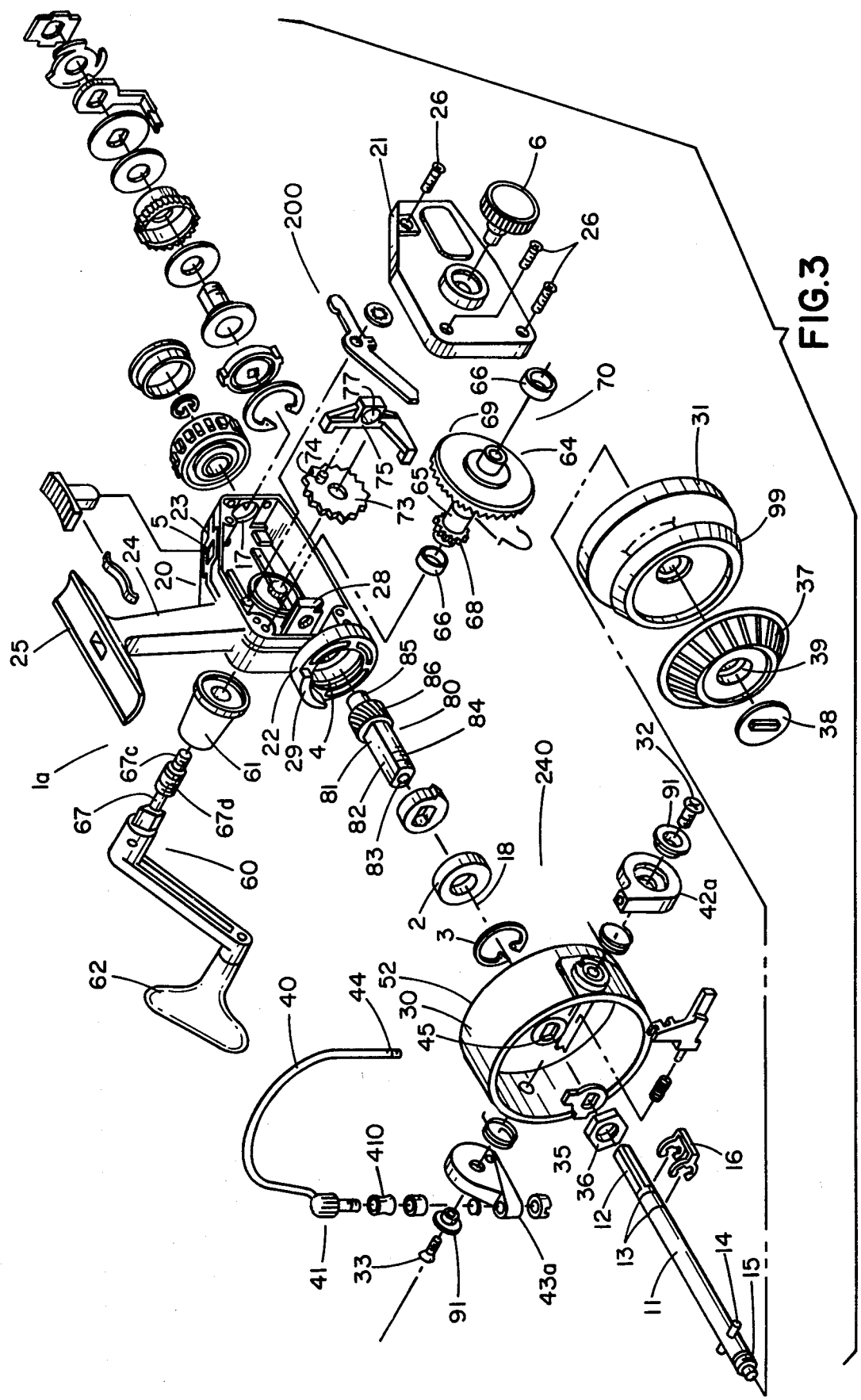
FIG. 3 is an exploded perspective view of the conventional style spinning reel containing the invention described herein.
Figure 4:
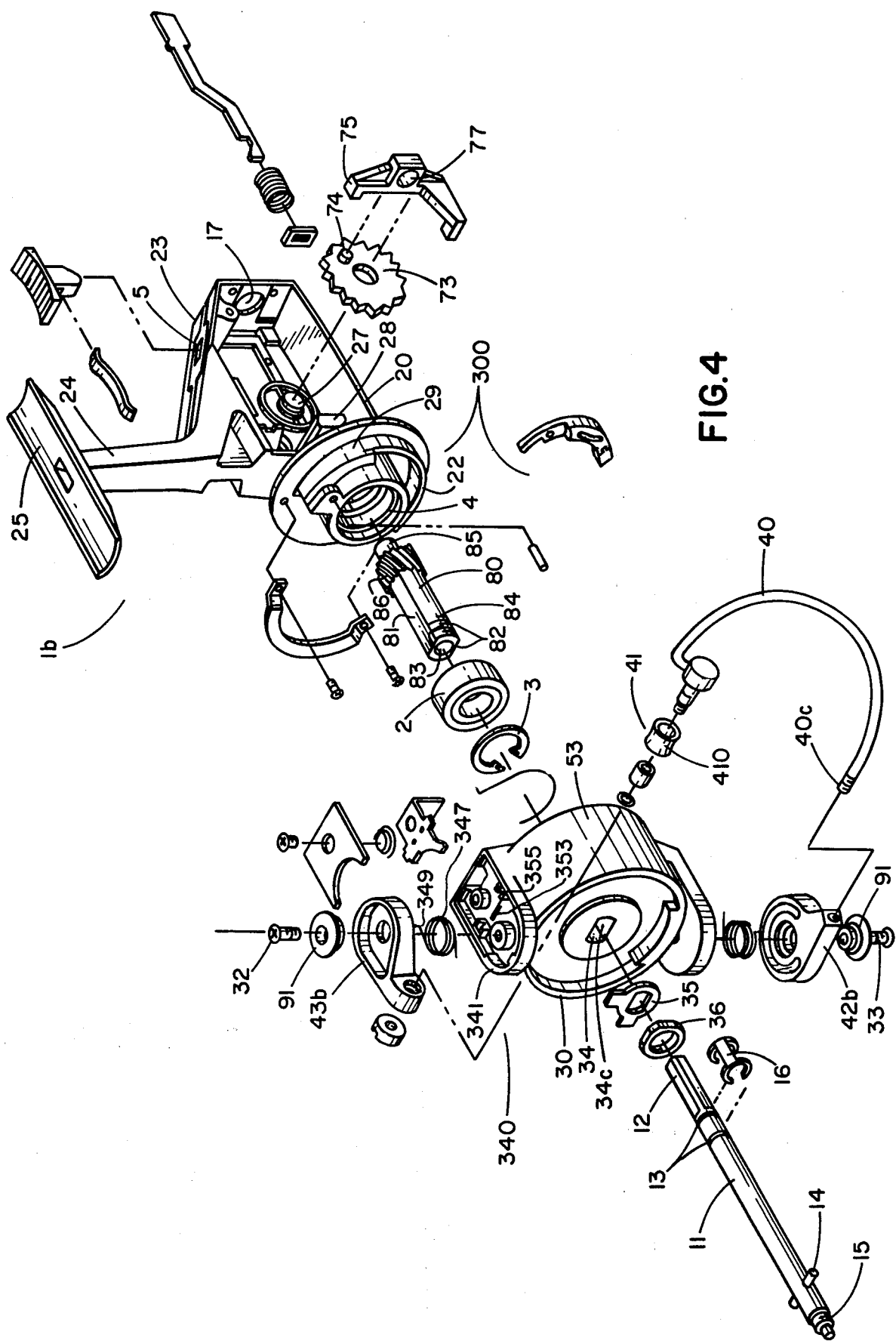
FIG. 4 is an exploded perspective view of the skirted style spinning reel not depicting some of the parts in common with the conventional reel shown in FIG. 3 but capable of incorporating the invention described herein.

A unique feature of reels 1a and 1b is the combined antireverse and self-centering bail feature that optionally can be used. In all spinning reels there is one best position in which to open the bail for casting, this is normally when the bail arms 42a, 42b, 43a and 43b are in generally vertical alignment with stem 24. Concomitantly, all reels need a device that prevents the rotor from rotating backwards or in the counterclockwise direction when the reel is viewed from the face or the spool 31. In the conventional reel 1a shown in FIGS. 1, and 3, self-centering mechanism 200 is depicted and in the skirted reel 1b as shown in FIGS. 2, and 4, the self-centering mechanism 300 is depicted.

Not only is the anti-reverse and self-centering of the bail necessary, an automatic mechanism that causes the bail to move from the casting position to the retrieve position by just a turn of the handle 62 is also required. In the conventional reel 1a, shown in FIG. 3, the automatic internal bail trip mechanism 240 is shown in an exploded view. Most of the mechanism is contained in the rotor cup 52 and cooperates with cam 29 on the face 22 of the housing 20. In the skirted reel 1b, shown in FIG. 4, the major portion of the unique (unique because most skirted reels have external bail trip mechanisms) internal bail trip mechanism 340 is contained in ear 341 on the rotor 30 and cooperates with the cam surface 29 on the front of the housing 20.

Figure 8:
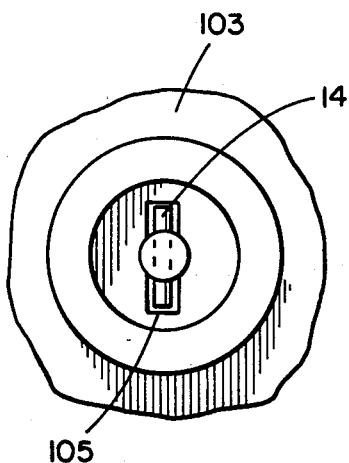

In a preferred feature of this invention, spool 31 is locked to the shaft 11 so that it cannot be easily removed and inadvertently become separated from the reel when a fisherman is fishing. The spool 31 comprises a front flange 102 secured to a central hub 101 which has a back flange 103 also secured to it. Bent edge 107 of the flange 102 holds spool retainer knob 37 in place from inadvertently separating from the spool 31. The knob has a central threaded portion 39 fixed to the knob 37 that has a mating thread to that of the shaft thread 15. Hub 101 has a central hole 104 that is concentric with the spool and is used for mounting the spool 31 on shaft 11. At the back of the hub 101 is an undercut groove 105 that is transverse to the hole 104 and extends radially outwardly therefrom. The front of the hub 101 has undercut portion 106 for accommodating the axially projecting threaded portion 39. The distance from the back of the hub 101 to the undercut face is C as seen in FIG. 8. The depth of the undercut groove 105 is a distance E. The distance from the bottom of the groove 105 to the face 106 is C-E.

Figure 5:
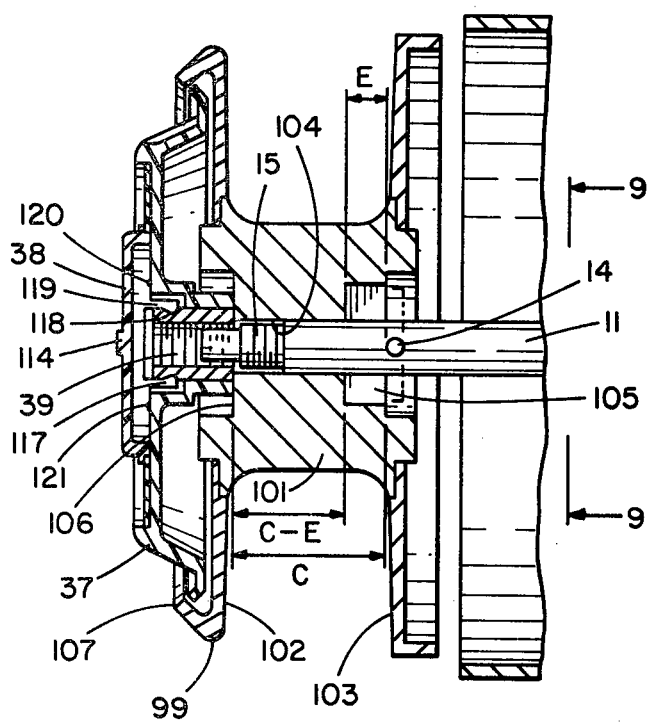
FIG. 5 is a cross sectional view of the spool mounting portion of the embodiment of this invention where the spool is not tightened on the reel shaft.
Figure 6:
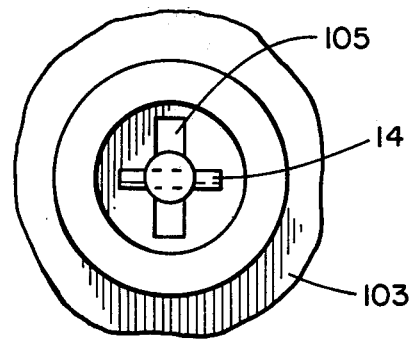
FIG. 6 is a partial back section view of FIG. 5.
Figure 7:
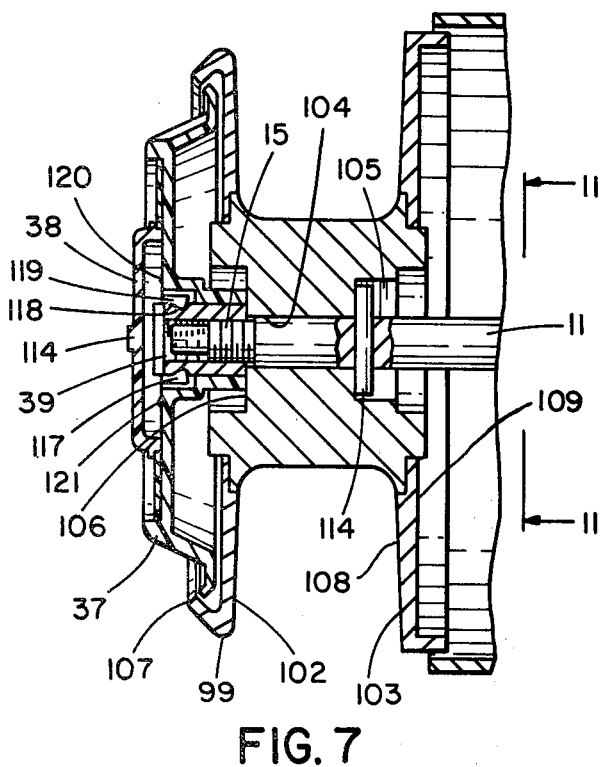
FIG. 7 is a partial cross sectional view of the spool of the fishing reel as it is locked in place on the shaft; and, FIG. 8 is a partial cross sectional view of FIG. 7.

The distance from the pin 14 to the thread 15 on the shaft 11 is a distance X which is greater than C-E but less than C. When the spool 31 is placed on the shaft 11 and the groove 105 and the pin 14 do not coincide, as shown in FIGS. 5 and 6, then the threaded portion 39 cannot reach the thread 15 and obviously the spool 31 cannot be tightened on the shaft 11. When the spool 31 is rotated and the pin 14 fits into and corresponds with groove 105, there is a positive snapping sound. In this position the thread 39 of the knob 37 can be tightened on the thread 15 and the spool 31 locked in place on the reel. The mating of the groove 105 and the pin 14 prevents any relative movement between the shaft 11 and the spool 31. The spool 31 is secured in position as depicted in FIGS. 7 and 8. This invention is applicable to both the conventional and skirted spinning reels.

Figure 10:
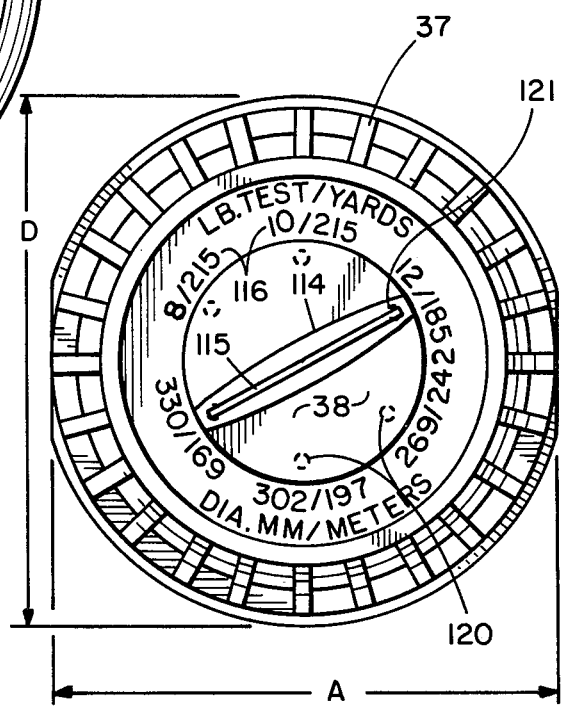
FIG. 10 is a view of the indicator knob.
Figure 11:
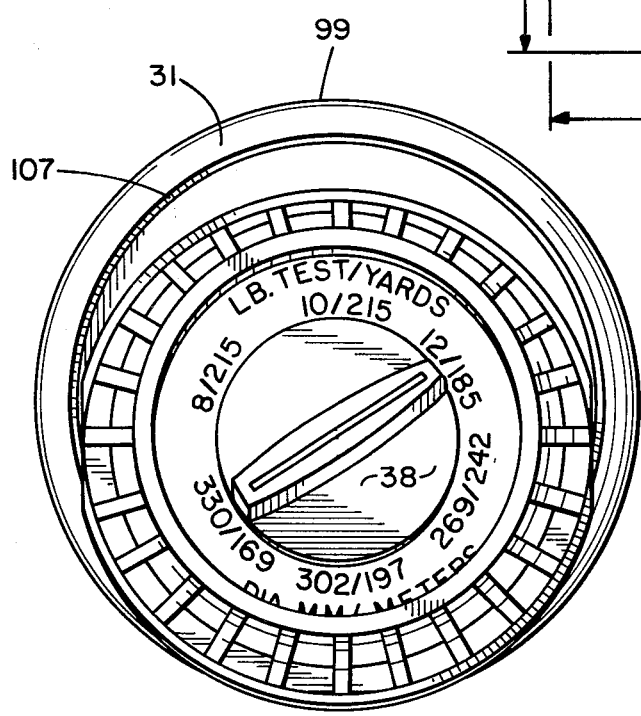
FIG. 11 is a front view of the spool and indicator knob as they are being fitted together.

In another feature of the invention the threaded portion 39 has an axially projecting portion with groove 118 therein. The cap cover 38 has an inwardly projecting protrusion 119 segmented into several parts with inwardly projecting circular lugs 117. The lugs 117 snap into the grooves 118 and is held thereby by the resiliency of the plastic or metal material making up the cap cover 38. On the outward face of the knob 37 are dedents 120 and mating thereto is a small projection 121 on the inner face of cover 38 as best shown in FIG. 5. The dedents and projection coincide with the line size and length designations 116 on the face of knob 37, as shown in FIGS. 10 and 11. Indicator 114 can be rotated to indicate the line size and length (designations 116) so a fisherman can momentarily ascertain the size of the fishing line on the spool 31. This is particularly handy since fishermen generally carry several fishing line spools for a single reel and use them interchangably depending upon fishing conditions.

Figure 9:
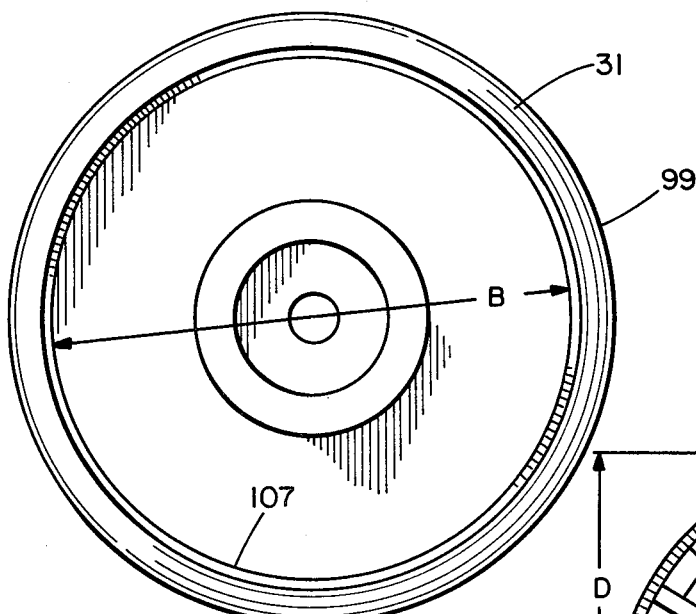
FIG. 9 is a front end view of the spool of this invention without the indicator knob.

In the preferred embodiment of the invention, the knob 37 is generally held in rotatable association with the spool 31 by means of front edge 107 as shown in FIG. 9, front edge 107 has a diameter "B". The knob 37 has a general diameter "D" which is greater than "B" but also has two parallel flats with a diameter "A" that is less than "B". Thus it is possible to push the knob 37 into and under the bent edge 107 so that the knob 37 can be retained by the spool 31. Because of this it is also possible to pry the knob 37 out from underneath edge 107 if it is accomplished in a manner that is similar to that shown in FIG. 11. Thus, the knob 37 is both retained and free-floating with respect to the spool 31 and can remain permanent with the spool so that it may act as a permanent line indicator.

Although specific embodiments of the invention have been described, many modifications and changes may be made in the fishing reel without departing from the spirit and scope of the invention as defined in the appended claims.

What is claimed is:

1. In an open face spinning reel used for casting a bait attached to a fishing line and for retrieving the bait and fishing line after casting, the reel having a housing, a center shaft mounted in the housing, a spool mounted on the shaft for holding the fishing line, a handle and gear train assembly mounted in the housing, a rotor coaxially mounted on the shaft and rotatable by cooperative movement of the handle and assembly, and a movable bail mounted on the rotor having an open casting position and a closed retrieving position, the improvement comprising:
    (a) the spool having a circular front flange having an inwardly directed radial edge, the edge projecting towards the center shaft, the diameter of the edge being "B" with the diameter of the spool underneath the edge being a diameter greater than "B"; and,
    (b) a substantially circular retainer knob having an overall diameter "D" which is greater than "B" and having two flat portions spaced apart a distance "A" which is smaller than "B", the knob being retained by the spool by pushing the knob underneath the edge in a direction parallel to the flat portions whereby the edge with its diameter "B" retains the knob with its diameter "D" in the spool.

2. The reel of claim 1 wherein the spool is made of metal.

3. The reel of claim 1 wherein the knob is made of plastic.

4. The reel of claim 1 wherein the knob contains a center threaded section.

5. The reel of claim 4 wherein the threaded section is made of metal.

6. The reel of claim 4 wherein the threaded section remains centrally located in the spool for ease of attachment to shaft.

7. In a fishing reel used for storing a fishing line before casting and for storing the fishing line after casting, the reel having a housing, a center shaft mounted in the housing, a spool mounted on the shaft for holding the fishing line, means mounted on the reel for winding the fishing line on the spool, the improvement comprising:
    (a) the spool having a circular front flange having an inwardly directed radial edge, the edge projecting towards the center shaft, the diameter of the edge being "B" with the diameter of the spool underneath the edge being a diameter greater than "B"; and,
    (b) a substantially circular retainer knob having an overall diameter "D" which is greater than "B" and having two flat portions spaced apart a distance "A" which is smaller than "B", the knob being retained by the spool by pushing the knob underneath the edge in a direction parallel to the flat portions whereby the edge with its diameter "B" retains the knob with its diameter "D" in the spool.

* * * * *